Patented Sept. 22, 1925.

1,554,505

UNITED STATES PATENT OFFICE.

WILLIAM MORGAN JOHNSON, OF NEWARK, NEW JERSEY.

NONINFLAMMABLE NITROCELLULOSE COMPOSITION.

No Drawing.   Application filed February 10, 1925.   Serial No. 8,297.

*To all whom it may concern:*

Be it known that I, WILLIAM MORGAN JOHNSON, a citizen of the United States, residing in the city of Newark, county of Essex and the State of New Jersey, have invented certain new and useful Improvements in a Noninflammable Nitrocellulose Composition, of which the following is a specification.

This invention relates to an improvement in the composition disclosed in my application No. 586,952, filed September 8th, 1922. In experimenting, I have found that certain chemical substances, as heretofore contained in my previous application, can be omitted from my composition, to avoid their deleterious effects upon the nitro-cellulose material. My object is to also explain my process in the combining of the ingredients of my composition, to afford best results in the forming of a non-inflammable nitro-cellulose material.

My composition consists of a mixture of substances, such as, calcium chloride, aluminum sulphate or alum, sodium acetate, with the addition of sodium borate. This group of materials or substances, I pulverize to a fine powder and mix together while in a dry form. A solution of alcohol and camphor, is then added to my composition, in sufficient quantity to form the whole into a paste. This camphorated composition is placed in a covered receptacle and subjected to heat, whereby it is allowed to come to a boil it being stirred continually during the operation to produce a thorough mixing, after which it is removed to a cool atmosphere to congeal. The above procedure serves to bring the camphor and the other ingredients of the composition into most intimate contact. The nitro-cellulose mass is prepared in the usual way, to the consistency of a jelly, or a flowable solution if so desired. To facilitate a better incorporation of the materials, my composition may be partially suspended in a solution of alcohol, or other good nitro-cellulose solvent, before combining with the nitro-cellulose mass. The nitro-cellulose batch is sufficiently mixed to ensure a thorough impregnation of my composition therewith. I prefer adding my composition during the steeping or kneading process, these processes being well known to the celluloid industry. When the excess alcohol has been evaporated, the nitro-cellulose batch with which my composition is combined may be rolled, pressed, etc., following the regular operations of celluloid manufacture. The finished product is a non-inflammable nitro-cellulose material, with all the properties of celluloid, which may be pressed or molded into different articles as required. I find that excellent results may also be obtained in the reconversion of waste or scrap celluloid by the addition of my composition, employed in the same manner, as heretofore described.

In preparing my composition, I prefer using the following ingredients in the following proportions; calcium chloride, two parts, aluminum sulphate or alum, one part, sodium acetate, one part, and sodium borate, one part. This group of materials are combined and mixed into paste form with a solution of alcohol and camphor, whereupon they are subjected to heat until brought to a boil, thus bringing the camphor and materials into close or intimate contact. The camphorated composition is added to the nitro-cellulose mass in the following proportions; from one to three parts of my composition to ten parts of a nitro-cellulose mass. The three first named ingredients of my composition. viz; calcium chloride, sodium acetate, and aluminum sulphate or alum, in a combination, form an excellent anti-combustion medium. The sodium borate, I use as a drying agent to offset the hygroscopic tendencies of the three aforesaid ingredients. The camphor, I combine with my composition to facilitate a better incorporation with the nitro-cellulose mass.

I am aware that prior to my invention, these certain chemical ingredients in their individual form, are not a new discovery and that some of these ingredients individually, have been used in combination with nitro-cellulose, I therefore do not claim to use these ingredients separately, or in every conceivable manner for my purpose, but in my years of experimenting to eliminate the inflammability of celluloid, I have conscientiously selected the certain agents, as described in this specification, to build up a master anti-combustion medium, which will produce a non-inflammable gas, sufficient in volume, to counteract the inflammable gas, as produced by the nitro-cellulose material at the time of conflagration. I have carefully selected the agents, as employed in my composition, for their excellency in this respect. To prevent any injurious effect to the structure of the nitro-cellulose when combined with my composition, I have furthermore conceived a process of camphorating each molecule particle of these respective agents, as previously explained in this specification. These camphorated particles are distributed throughout the nitro-cellulose mass, whereby they remain dormant, until at the moment of conflagration they may serve their purpose. My process of camphor treating the chemical ingredients of my composition, serves to prevent any injury to the tissue of the nitro-cellulose material and facilitates a better incorporation therewith. I have selected camphor for use in my process, as it is one of the principles employed in the manufacture of nitro-cellulose materials.

Having explained my invention in detail, what I claim and desire to secure by Letters Patent is:

1. A plastic non-inflammable composition comprising an anti-combustion medium consisting of a mixture of two parts calcium chloride, one part sodium acetate, one part alum, and one part sodium borate and a camphorated alcoholic solution, sufficient to produce a paste like mass thereof in combination with a celluloid mass in proportions whereby the latter preponderates.

2. A plastic non-inflammable composition comprising ten parts of a celluloid mass to one to three parts of an anti-combustion medium consisting of a mixture of two parts calcium chloride, one part sodium acetate, one part alum, one part sodium borate, and a camphorated alcoholic solution, sufficient to produce a paste like mass thereof.

WILLIAM MORGAN JOHNSON.